June 29, 1954    L. F. CARTER    2,682,115
GYRO COMPASS
Filed Sept. 7, 1950    2 Sheets-Sheet 1
Fig.1.
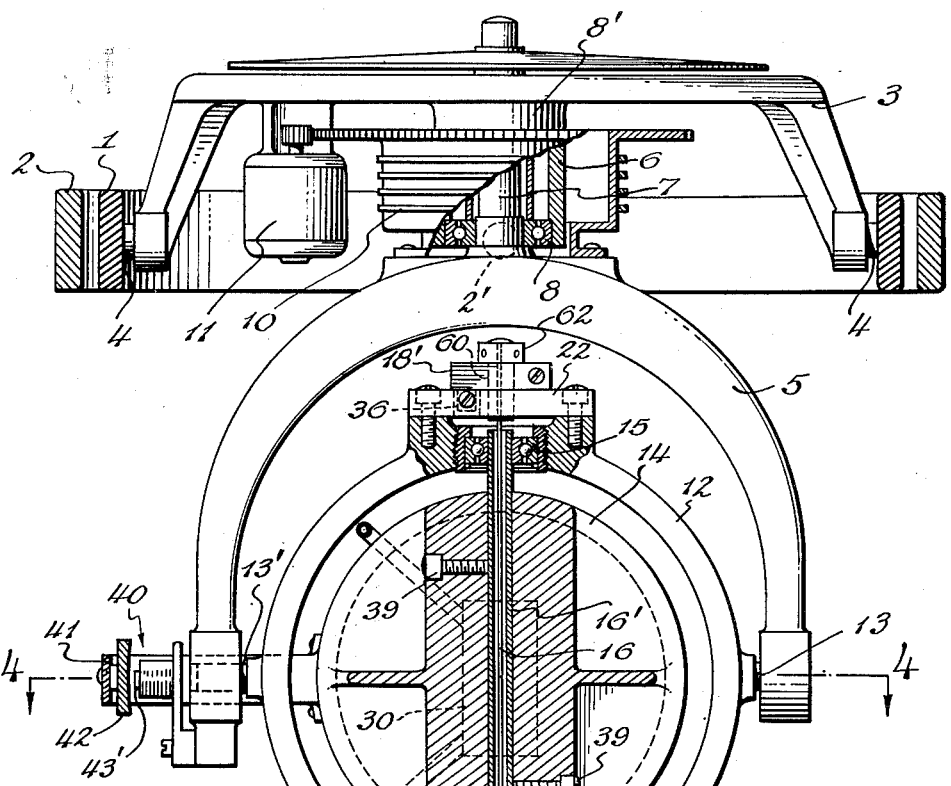
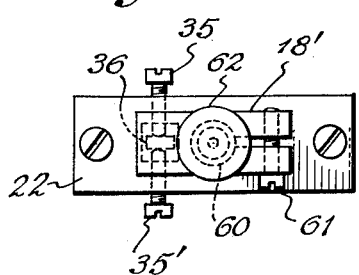
Fig.2.
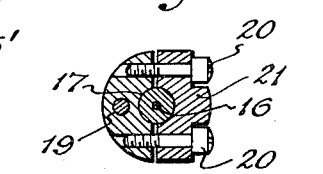
Fig.3.
INVENTOR
LESLIE F. CARTER
BY
Herbert H. Thompson
his ATTORNEY.

June 29, 1954  L. F. CARTER  2,682,115
GYRO COMPASS
Filed Sept. 7, 1950  2 Sheets-Sheet 2
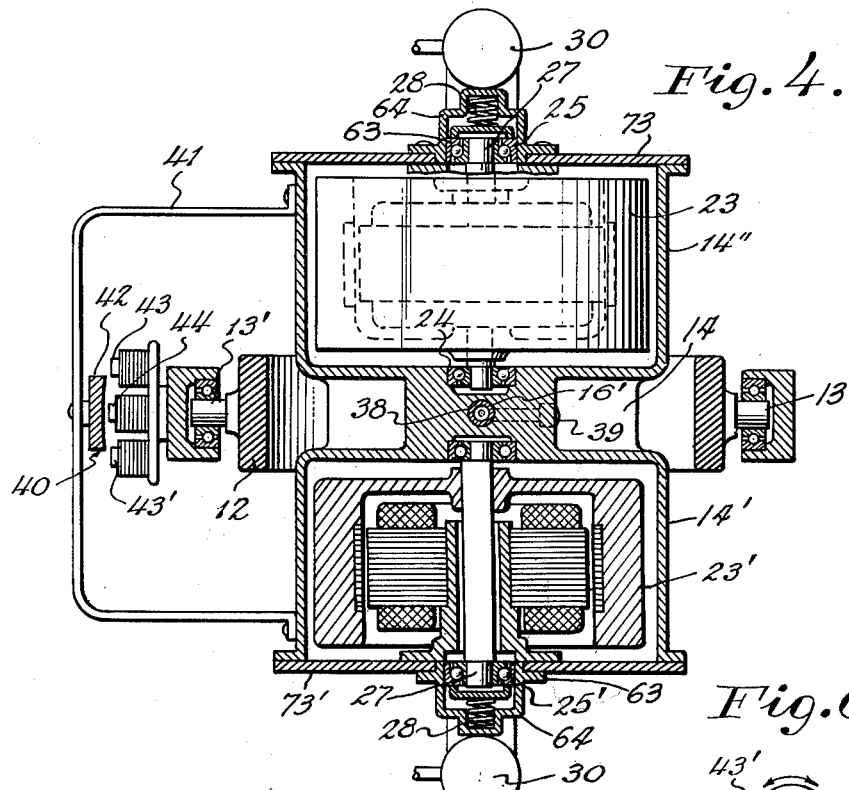
Fig. 4.
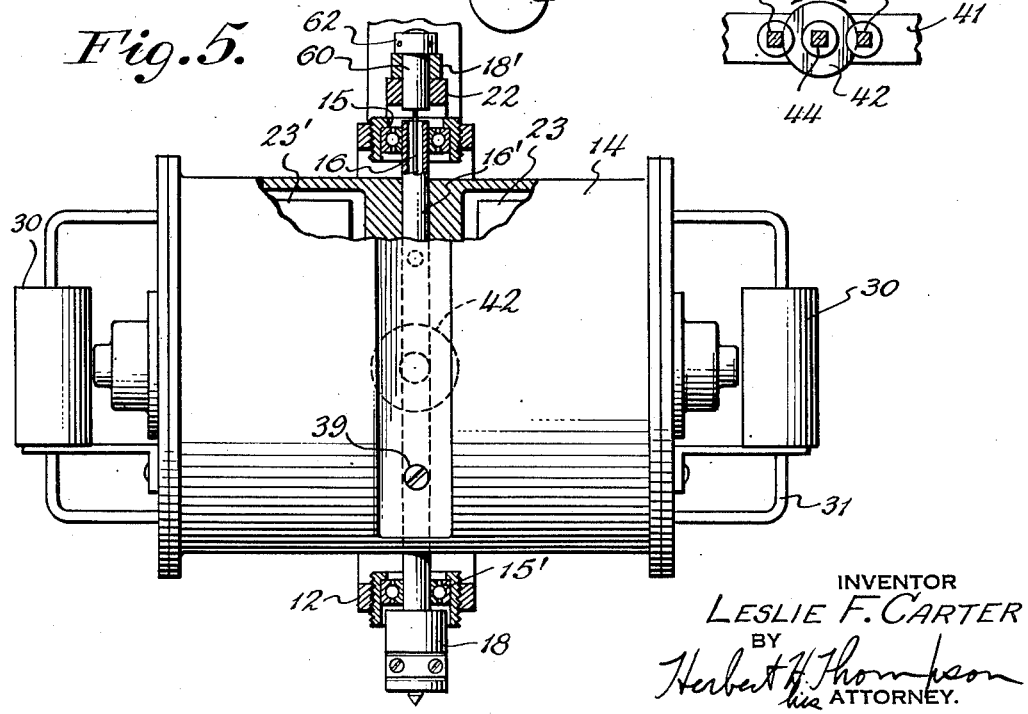
Fig. 5.
Fig. 6.
INVENTOR
LESLIE F. CARTER
BY
Herbert H. Thompson
his ATTORNEY.

Patented June 29, 1954

2,682,115

UNITED STATES PATENT OFFICE 2,682,115

GYROCOMPASS

Leslie F. Carter, Leonia, N. J., assignor to The Sperry Corporation, a corporation of Delaware Application September 7, 1950, Serial No. 183,580

5 Claims. (Cl. 33—226)

This invention relates to sensitive gyroscopes such as used to give a directional or other reference and wherein the maintenance of perfect balance about the axis of support is essential to proper operation. More particularly, my invention relates to improvements in gyro compasses whereby any shift in the balance of the compass about its horizontal axis due to temperature changes, is avoided by employing two matched rotors, one on each side of the center of support and so arranged that any shift in the balance of one due to temperature changes is matched and cancelled by equal and opposite shift of the center of gravity of the other rotor.

By my invention I have also greatly simplified the construction of gyro compasses and lessened the over-all clearance. One aspect of my invention constitutes an improvement on the type of gyro compass shown in the prior patent to Arthur L. Rawlings, No. 1,923,885, dated August 22, 1933, which consists in eliminating the downwardly extending tube containing the torsion suspension by incorporating it within the body of the sensitive element of the gyro compass which, in this type of compass, comprises a common rotor case for both rotors. A further improvement constitutes in so arranging the follow-up controller or pick-off that no wires for the control need be led into the sensitive element, as is the case in the aforesaid Rawlings compass.

Further improvements secured by my invention will be apparent from the following more detailed description.

Referring to the drawings,

Fig. 1 is a south elevation partly in section of my improved gyro compass, looking north;

Fig. 2 is a detailed top view of the upper support for the torsion suspension;

Fig. 3 is a transverse detail section on line 3—3 of Fig. 1 at the bottom of the torsion suspension;

Fig. 4 is a horizontal section on line 4—4 of Fig. 1;

Fig. 5 is a side elevation view of the rotor case, the vertical ring and part of the casing being in section;

Fig. 6 is a side elevation of the pick-off or control of the follow-up system, partly in section.

The gyro compass is shown as supported in usual gimbal ring 1 within the binnacle ring 2 on a trunnion axis 2' normal to the paper in Fig. 1. The compass spider 3 is pivoted within gimbal 1 on second trunnion axis 4. The follow-up element or phantom 5 of the compass is journaled for rotation about a vertical axis within a downwardly extending housing 6 of the spider 3, the phantom 5 being shown as having an upwardly extending stub-shaft 7 journaled in spaced bearings 8 and 8' in the spider. Slip rings 10 are shown for leading current into the spinning motors 23, 23' mounted in the directional or sensitive element 14 and into the pick-off device 40 for the follow-up system. The follow-up motor 11 is energized from said pick-off device to cause the follow-up element 5 and therefore the vertical ring 12 to follow the angular movements of the sensitive element or rotor case 14.

According to my invention, the major pivotal axis between the spider and sensitive element is horizontal instead of vertical as in the usual gyro compass. Therefore, the vertical ring 12 is journaled in the spider 5 on normally horizontal trunnions 13, 13'. The rotor case 14 in this instance is journaled in the vertical ring upon normally vertical bearings 15, 15'. The shaft forming the trunnions for such bearings is shown as extending from the rotor case, both above and below, and is preferably made hollow or in the form of a tube 16' through which extends torsion suspension 16 by which the rotor case is suspended within the vertical ring. It has long been recognized in the art that such torsion wires 16 should be long in order to avoid exerting a twist on the sensitive element when the follow-up element is not exactly aligned with the sensitive element. To provide such long suspension it has heretofore been necessary to employ fairly long housings at either the top of the compass as in the usual gyro compass or at the bottom as shown in the aforesaid Rawlings patent.

According to my invention, however, I pass the suspension wire through the middle of the rotor case and thereby utilize the entire diameter of the vertical ring to provide space for a long suspension wire 16. The wire is shown as anchored at the top and bottom respectively to the vertical ring 12 and in effect to case 14, the lower anchorage being shown in detail at the bottom of Fig. 1 and in Fig. 3. The lower end of the wire is shown as enlarged at 17 and clamped in a bracket 18 firmly crimped on to the lower end of the tube 16', which is fixed within and extends below a bore 38 through case 14. Bracket 18 is shown as split crosswise for a portion of its diameter and the free ends drawn together by set screw 19 to bind the same on the lower end of the tube and hence fixed to the bottom of case 14. The enlarged end 17 of the torsion wire is firmly clamped to the block by set screws 20 which clamp the small block 21 slidably mounted in a recess in the block against the portion 17. The upper end of the wire may be clamped in similar fashion to the upper split bracket 18' by means of set screw 61, the wire 16 being provided with an enlarged sleeve 60 having a head portion 62 resting on bracket 18'. The bracket 18' is secured to the top of the vertical ring 12, being mounted on a platform 22 thereon, so that the entire weight of the rotors and their two-part case is pivotally hung from the top of the vertical ring by suspension wire 16 secured to the bottom of the tube 16' which is clamped within rotor case 14 whereby said case is supported at its bottom by wire 16 passing upwardly through the middle thereof.

Final adjustments in the position of the torsion suspension may be secured by adjusting the set screws 35, 35' in plate 22 (Fig. 2), the inner ends of which bear on downward extension 36 from the block 18' so that the rotary position of the block and therefore of the top of the torsion suspension can be adjusted until the wire has zero torsion when the rotor case and vertical ring are in the same position in azimuth. The aforesaid tube 16' may be clamped within the bore 38 in the rotor case by means such as set screws 39.

As stated hereinbefore, I employ twin, matched rotors 23, 23' mounted for spinning about normally horizontal aligned axes within the two parts of the rotor case 14, which may be formed as two separate casings 14', 14'', if desired. The trunnion or shaft of each rotor is journaled in its respective casing by fixed bearings 24, 24' and slidably mounted bearings 25, 25' to permit opposite expansion and contraction of each rotor shaft toward and away from the center of suspension 16. Preferably the inner race of each of the outer rotor bearings 25, 25' is fast to its rotor shaft 27 and the outer race 63 is slidably mounted in the bearing housing 64 and supported in the outer wall 73 or 73', but is yieldingly pressed inwardly by coil spring 28 so that no free end play is permitted. By this arrangement the balance of the compass will not be disturbed by such expansion and contraction since upon a temperature rise, the center of gravity of the rotor 23 will move away from the vertical center of the system (i. e., suspension wire 16) in one direction, while the center of gravity of the other rotor 23' will move in the opposite direction, so that the balance about the horizontal axis 13, 13' (Fig. 4) will not be disturbed.

Meridian seeking properties may be imparted to the compass by any suitable form of pendulous factor. As shown, the pendulous factor comprises mercury containers 30, 30' secured to the opposite sides of the rotor case and connected by a restricted tube 31 as is common in the art. Damping may be provided very simply in this type of compass by the addition of an unbalanced mass to the west side of the gyro compass as shown in Fig. 1. The hereinafter mentioned bracket 41 and armature 42 may form such a mass. When the gyro axle becomes inclined therefore, a torque is exerted about the vertical axis of the gyroscope in such a direction as to cause precession in the direction to reduce the inclination and thereby damp the compass through reaction on the follow-up element, the action being somewhat similar to the usual eccentric connection employed in the art between the ballistic and the rotor casing.

I prefer to locate the pick-off 40 which controls the follow-up motor 11 in such manner that no wires (other than the gyro motor leads, which are not shown) need be led into the same across either axis of the sensitive element, which has not heretofore been accomplished in this type of gyro compass. To this end I secure a U-shaped bracket 41 to the rotor case extending around the horizontal trunnion 13' and carrying one element 42 of the pick-off, preferably the element to which no lead in wires need be connected. The pick-off is shown in the form of an inductive pick-off and the aforesaid element 42 is shown as a soft iron armature. Preferably, this armature is made circular or dish-shaped as shown in Fig. 6 with its center aligned with the trunnion axis 13, 13' of the rotor case. The wound poles 43, 43', 44 of the other part of the inductive device are symmetrically placed across the horizontal diameter of the disc 42, so that a signal will be generated whenever there is relative displacement in azimuth or orientation between the rotor case 14 and the follow-up element or phantom 5. All pick-off windings are therefore carried by the follow-up element and current therefore will be led in through slip rings 10 and need not be led across the trunnions supporting the sensitive element. By employing a circular armature, generation of any signal by relative tilt of the rotor case and phantom 5 is avoided. It should be noted that the vertical ring 12 as well as the phantom 5 is kept aligned by the follow-up system with the rotor case since any orientation of phantom 5 is imparted to the vertical ring through the trunnions 13, 13'. By this means the vertical ring is kept aligned with the rotor case in azimuth thereby avoiding torsion on the torsion suspension.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro-compass of the torsion suspension type, comprising a follow-up supporting frame mounted for turning in azimuth, a vertical ring journaled therein for oscillation about a horizontal axis, a rotor case within said vertical ring, means for journaling and suspending said case in and from said vertical ring for freedom about a vertical axis comprising hollow trunnions journaling said case in said vertical ringlike rotors journaled on rotor bearings on each side of said case, a suspension wire extending through said trunnions and the center of said case and anchored at the upper end to said ring and at the lower to said case, and a motor for orienting said frame and vertical ring upon relative displacement in azimuth of said case and ring or frame.

2. A gyro-compass of the torsion suspension type, comprising a follow-up supporting frame mounted for turning in azimuth, a vertical ring journaled therein for oscillation about a horizontal axis, a rotor case within said vertical ring, means for journaling and suspending said case in and from said vertical ring for freedom about a vertical axis comprising a tube journaled in said vertical ring and extending through the middle of said case, like rotors journaled on rotor bearings on each side of said tube, a suspension wire extending through said tube and anchored at the upper end to said ring and at the lower to said case, and a motor for orienting said frame and vertical ring upon relative displacement in azimuth of said case and ring or frame.

3. A gyro-compass of the torsion suspension type, comprising a follow-up supporting frame mounted for turning in azimuth, a vertical ring journaled therein for oscillation about a horizontal axis, a rotor case within said vertical ring, means for journaling and suspending said case in and from said vertical ring for freedom about a vertical axis comprising a tube journaled in said vertical ring and extending through the middle of said case, like rotors on each side of said tube, bearings permitting relative expansion or contraction of the opposite ends of the two rotor shafts and case, spring means for taking up end play at said ends, a suspension wire extending through said tube and anchored at each end to said frame, and a motor for orienting said frame and vertical ring upon relative displacement in azimuth of said case and ring or frame.

4. In a gyroscopic compass, a gyro rotor case, a vertical ring, upper and lower guide bearings between said case and ring, a torsion suspension between said case and said ring supporting the case at the bottom from the top of the ring, a follow-up controller to cause the ring to follow the case in azimuth, a follow-up member in which said ring is pivoted on a horizontal axis, pivotal means at the top of said member mounting said member for turning about a vertical axis, and a follow-up motor controlled by said controller for turning said member and ring, said controller being adapted to generate a signal upon relative displacement between said case and member along said horizontal axis.

5. In a gyroscopic compass, a gyro rotor case, a vertical ring, upper and lower guide bearings between said case and ring, hollow journals on said case journaling the same in said ring at top and bottom, a torsion suspension secured to the bottom of the case adjacent the lower journal and to the top of the vertical ring adjacent the upper journal, said suspension extending through said case, and follow-up means causing the ring to follow the case in azimuth but not in elevation.

References Cited in the file of this patent

UNITED STATES PATENTS

| Number | Name | Date |
|---|---|---|
| 1,923,885 | Rawlings | Aug. 22, 1933 |
| 1,959,804 | Wittkuhns et al. | May 22, 1934 |
| 2,009,263 | Henderson | July 23, 1935 |
| 2,256,475 | Esval et al. | Sept. 23, 1941 |
| 2,269,103 | Harding et al. | Jan. 6, 1942 |